United States Patent [19]

Cross

[11] Patent Number: 5,253,455
[45] Date of Patent: Oct. 19, 1993

[54] FIRE DAMPER

[76] Inventor: Jeffery M. Cross, 122 Hickory Trail, Cumming, Ga. 30130

[21] Appl. No.: 702,182

[22] Filed: May 20, 1991

Related U.S. Application Data

[63] Continuation-in-part of Ser. No. 535,464, Jun. 8, 1990, abandoned.

[51] Int. Cl.$^5$ .............................................. E04B 1/00
[52] U.S. Cl. ............................................ 52/1; 52/218; 137/75
[58] Field of Search ................... 52/1, 232, 317, 220, 52/218; 137/67, 69, 75, 76, 77, 360, 362

[56] References Cited

U.S. PATENT DOCUMENTS

| | | | |
|---|---|---|---|
| 2,630,818 | 3/1953 | McRae | 137/75 |
| 3,726,050 | 4/1973 | Wise et al. | 52/1 |
| 4,562,853 | 1/1986 | Tschirky et al. | 137/75 |

FOREIGN PATENT DOCUMENTS 3218573 10/1983 Fed. Rep. of Germany ........ 52/232

Primary Examiner—Michael Safavi
Attorney, Agent, or Firm—Harry I. Leon

[57] ABSTRACT

A fire damper for impeding the spread of fire from the burning of plastic pipes inside a wall or floor structure. The fire damper is installed adjacent to only one side of an opening where the pipe penetrates the structure so that the damper can be added as a retrofit without disturbing the pipe. The damper comprises a base which can be easily mounted on a two by four or similar structural member, a disk-like gate, and a torsion spring. The gate is slightly larger in area than the opening for the pipe. The coil of the spring acts as a hinge connection between the gate and the base. One arm of the spring is fixed to the gate. The free end of the torsion spring is activated by rotating the gate toward the base and then pressing the base against the plastic pipe before securing the base permanently in place. When plastic pipe immediately below the damper is ignited, heat softens the pipe proximate to the gate allowing it to crush the softened pipe, thereby cutting off the flow of hot gases through the pipe and preventing it from serving as a wick-like conduit for the flames.

8 Claims, 4 Drawing Sheets

FIRE DAMPER

CROSS-REFERENCE TO RELATED APPLICATION

This application is a continuation-in-part of application Ser. No. 07/535,464, filed Jun. 8, 1990, now abandoned.

BACKGROUND OF THE INVENTION

1. Field of the Invention

This invention relates to devices for impeding the spread of fire in a frame structure along a plastic pipe or through an opening in such a structure where a pipe existed previously. If a fire occurs on one side-of the wall or floor defining the opening, experience has shown that plastic pipes, now almost universally used as a building component, either ignite, soften or disintegrate quickly from heat generated by the fire. The present invention provides an apparatus for alternately sealing the opening in the absence of the pipe or simultaneously pinching off the pipe and sealing the opening as the pipe softens, thus preventing flames and heat from the fire from spreading to other parts of the building along the pipe or through the opening.

2. Description of the Prior Art

Following the advent of plastic pipe as a component in residential and commercial buildings, it was soon discovered that the use of plastic pipe unintentionally caused a fire hazard by providing a wick-like conduit for transmitting fire from one part of a building to another and, once the pipe had been removed by the fire or otherwise, an open passageway for fire through a wall or floor. These plastic pipes, commonly made of thermoplastic materials such as polyvinylchloride, polyethylene, are now used, for example, as water and sewer drain lines. Ordinarily, the wall or floor through which a drain line passes must be cut to accomodate the pipe. It is common for the pipe in such a drain line to be 5 inches in diameter or larger. Even when the structure of a wall or floor is basically fireproof, exposure of the plastic pipe to extreme heat situated to one side of the structure causes the pipe there either to ignite or structurally weaken and ultimately to disintegrate, leaving the opening through the fireproof structure formerly occupied by the pipe unobstructed. This opening then allows heat and flames to spread to other parts of the building, negating the intended effect of the fireproof structure.

Various devices have been developed to close off the opening or the section of pipe remaining in the opening after the portion of the pipe subjected to the flame or heat has disintegrated. These devices generally comprise collars or sleeves which fit around the pipe at the opening, or actually extend through a passageway in the wall surrounding the pipe for the length of the passageway.

Wise et al. in U.S. Pat. No. 3,726,050 disclose such a device in which an elongated sleeve extends through a passageway for the pipe. This device includes a weight-loaded or springbiased shutter at each end of the sleeve. As the plastic pipe ignites or is softened by flames or heat, a shutter closes over the respective end of the sleeve. A strong limitation on such a combination is that the device cannot readily be retrofitted onto an existing building. To accomplish a retrofit, the pipe must first be removed so that the opening for it can be enlarged. Unless the opening through which the pipe passes is relatively large, the shutters and their accompanying supports may interfere with the insertion of the device into the opening. On the other hand, the opening must be sized to allow for the snug fitting of the sleeve, since if the sleeve does not fit snugly against the sidewalls of the opening, fire and heat could pass around the outside of the sleeve and thus through the wall. In any event, the sleeve must then be mounted in the opening so that the pipe can pass through it. The device taught by Wise et al. is clearly best suited for installation during new construction and not as a retrofit for existing buildings.

Other prior art devices close off the pipe by providing means for compressing the pipe between two opposed squeezing elements when the pipe sidewalls soften. This type of device is disclosed in U.S. Pat. No. 3,678,634 to Wise et al., U.S. Pat. No. 4,796,401 to Wexler, and U.S. Pat. No. 4,307,546 to Dolder. None of these devices provides for a fire damper that can be readily retrofitted to an existing building structure.

A guillotine-type shutter for closing off an opening occupied by a melting plastic pipe was disclosed by Blumenkranz et al., U.S. Pat. No. 3,462,890. This shutter also included an insulating material for covering the opening left after a softened pipe has been cut by a blade on the shutter. However, Blumenkranz's device has to be installed at the same time the pipe is installed.

Gaillot et al. in U.S. Pat. No. 4,136,707 disclose a combination in which a double gate is employed to close against the melted pipe and a secondary fire stop of a swollen material is employed to close the void left by the burning pipe. This device is particularly suited for use with large plastic pipes and has to be installed with the pipe.

SUMMARY OF THE INVENTION

In accordance with the present invention, there is provided a device to impede the spread of fire along a plastic pipe or through an opening in a structure by pinching off the plastic pipe as it becomes softened by heat or, upon the removal of the pipe prior to the fire, by the action of a damper closing off or capping an opening for the pipe in the building structure.

Briefly described, the device includes a mounting base of various shapes which enables the damper to be readily mounted onto existing building structures. For example, the base of the fire damper can be channel-shaped with a flat central support member and one or more flanges for ready installation onto the top plate of an existing wall. The base can alternately be a flat member without flanges for ready installation onto a flat surface such as a wall or floor, which would not allow for the provision of flanges on the base. Pivotally attached to the base is a door or gate. A spring is positioned between the base and the gate to urge the gate away from the top of the base. The damper is installed by mounting the base adjacent to the opening and resting the gate under tension against the outer side wall of a pipe. When the pipe is structurally weakened or disintegrated by fire, the gate is allowed to close over the opening, preventing heat and flames from passing through the opening.

Accordingly, it is an object of the present invention is to provide a fire damper which is durable in structure, inexpensive to manufacture, and efficient in operation.

Another object of the present invention is to provide a fire damper that can be readily installed on new building structures or retrofitted onto structures which include existing, previously plumbed plastic pipe without disturbing the pipe.

Another object of the present invention is to provide a fire damper having a mounting means of a size which is not dependent upon the size of the opening to be closed off.

Another object of the present invention is to provide a fire damper which can be installed without any sleeving of the pipe.

Another object of the present invention is to provide a fire damper which can be installed in any orientation without modification.

Another object with the present invention is to provide a fire damper of a design which can be installed proximate with the edge of either opposing side of an existing opening on one side of a wall or floor structure but proximate with the edge of only one such opposing side.

Another object to the present invention is to provide a fire damper which can be readily installed without special tools and without disturbing existing building structures.

Other objects, features and advantages of the present invention will be apparent from the following description when taken in conjunction with the accompanying drawings wherein like characters of reference designate corresponding parts throughout the several views.

DESCRIPTION OF THE PREFERRED EMBODIMENTS

Figure 1:
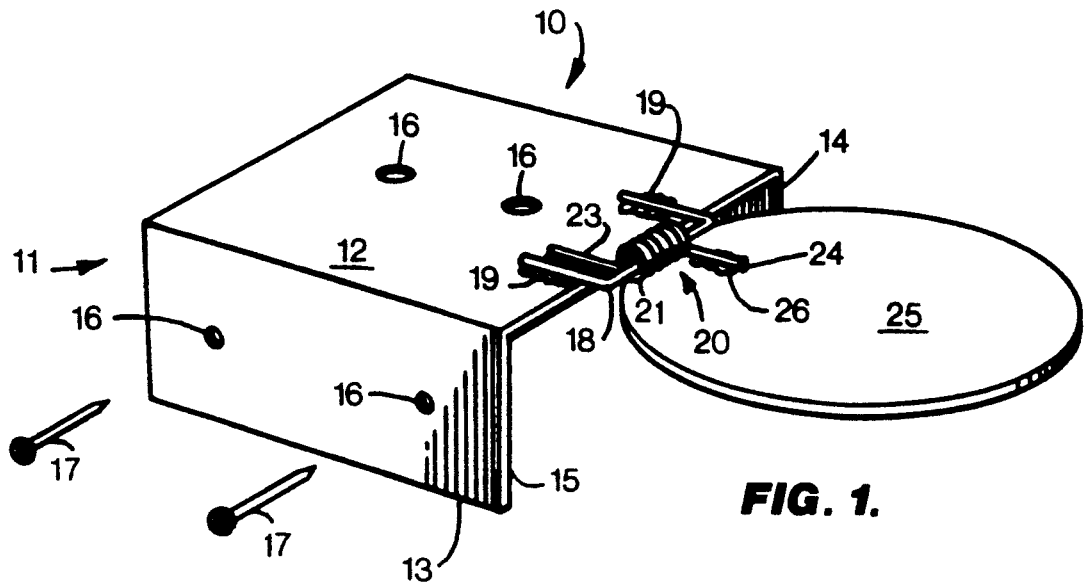
FIG. 1 is a perspective view of the fire damper of the present invention.

As shown in FIGS. 1 through 4, wherein like reference numerals designate identical, corresponding parts throughout the several views, a fire damper 10 according to the present invention, has an elongated, channel-shaped mounting frame or base 11. The base 11 includes a flat, plate-like support member 12 and opposed flanges 13 and 14 extending perpendicularly therefrom. The support member 12 and the flanges 13 and 14 form a channel 15 and define therethrough any desired number of openings, such as openings 16, adapted to receive the shank of an anchoring means such as a nail 17. Other suitable anchoring means such as pins, screws or rivets can be used. Welded to the upper surface of the support member 12, between the flanges 13 and 14, as shown in FIG. 1, is a tubular U-shaped hinge or spring support 18 with two generally parallel end branches. Weldments 19 are preferably used to secure the end branches of the support 18 immovably to the support member 12. The damper 10 further comprises a torsion force means such as a spring 20 which has a coil 21 with a passageway 22 therethrough for receiving the support 18. Opposed arms 23 and 24 project away from and perpendicular to coil 21.

As shown in FIG. 1, the arm 23 extends over and freely abuts the top surface of the support member 12 while the arm 24 extends over and abuts the top surface of a closure means or gate 25. In the embodiment illustrated in FIGS. 1 through 4, the arm 24 is welded by weldments 26 to the gate 25 so that the gate is permanently attached to the spring 20. As is also shown in FIG. 1 the spring 20 freely, slideably engages the support 18 so that support 18 passes through the passageway formed by the coil of the spring. The spring 20 is tensioned so that the arm 23 pushes against the top surface of the gate 25, urging the gate 25 away from the top surface of the supporting member 12. The spring 20 is utilized not only as a tension means but also as a component of the hinge which adds to the simplicity of the present invention.

Figure 2:
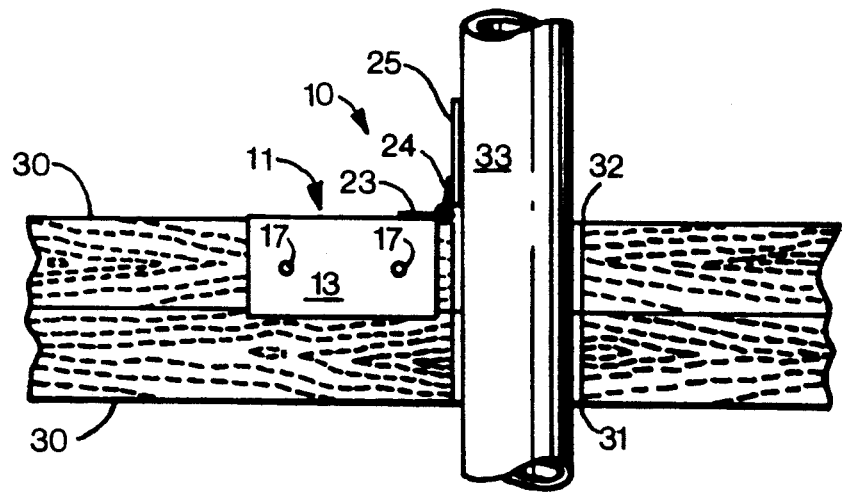
FIG. 2 is a side view of the fire damper shown in FIG. 1 installed astraddle a double top plate of a wall, a gate of the damper being shown in operative position adapted to press the proximate sidewalls of a plastic pipe together in the event they are softened.
Figure 4:
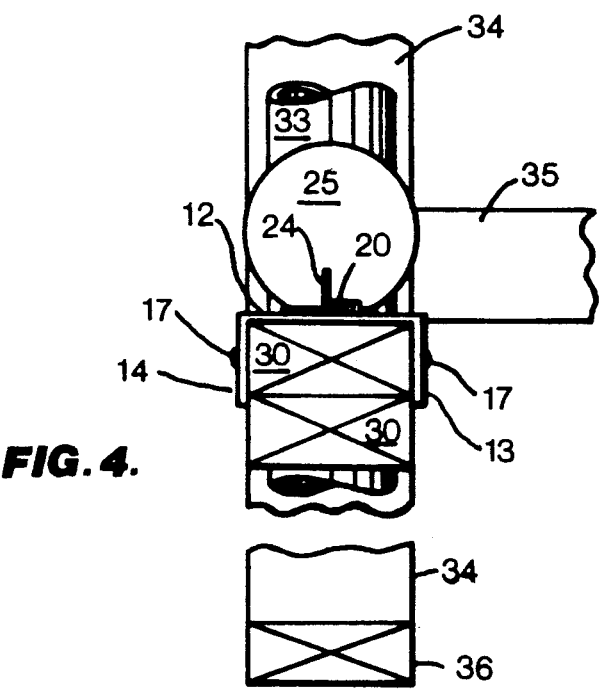
FIG. 4 is a rear elevational view of the fire damper shown in FIG. 2 from the left side of FIG. 2.

The damper 10 is preferably installed astraddle a framing member of rectangular transverse cross-section such as a double top plate (FIG. 2). One or more beams such as horizontal, laterally extending top plates 30 are normally included in the framing for upstanding walls of wood-frame buildings. Other typical framing elements include a wall stud 34, a joist 35 and a bottom plate 36 (FIG. 4). The top plates 30 define therethrough a vertical, elongate passageway 31, and further define along their upper surface an opening 32. Extending vertically through the passageway 31, above and below the top plates 30, is a plastic pipe or line 33.

When the damper 10 is mounted astraddle a top plate 30, the plate 30 is received within the channel 15; and the flanges 13 and 14 extend vertically downwardly on either side of the plate 30. The damper 10 can be selectively manufactured to provide for varying distances between the flanges 13 and 14 to allow the base 11 to be received astride plates of various widths. It is not necessary, however, that the plate 30 fit snugly between the flanges 13 and 14, as long as the gate 25 completely covers the opening 32 when the gate 25 is disposed against the plate 30.

As can be seen from FIG. 2, the base 11 is readily mounted onto the plate 30 adjacent the opening 32 without regard to the diameter of passageway 31. All that is necessary is for the gate 25 to be of a cross-sectional area larger than the cross-sectional area defined by the opening 32. To position the base 11 on the plate 30, one holds the damper 10 with the gate 25 pressed toward the top surface of the support member 12 against the tension provided by the spring 20. The damper 10 is then secured to the plate 30 when the gate 25 abuts the pipe 33 and the centerline of the gate 25 is aligned approximately parallel to the longitudinal axis of the pipe 33. Because the damper 10 is spring actuated, the device can be oriented with the gate 25 disposed at substantially any angle to accomodate an opening defined by an angular building structure.

Figure 3:
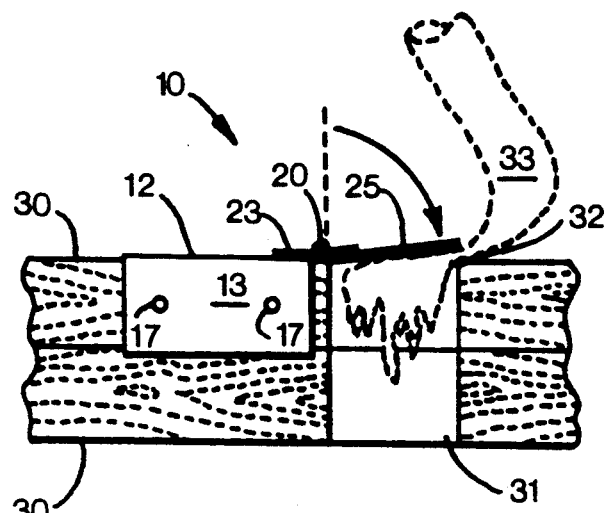
FIG. 3 is a side view of the fire damper according to FIG. 2, the gate being shown in operative position closing an opening for the pipe in the double top plate by pressing together softened sidewalls of the pipe which are proximate with the gate.

To close off the opening 32, the gate 25 must pivot about the spring support 18 (FIG. 3). When a fire occurs, the plastic pipe 33 will either begin to deform incrementally or will ignite and disintegrate very quickly or even instantaneously, depending upon the heat to which the pipe 33 is subjected. If the pipe 33 is subjected to heat from rising hot gases and begins to deform incrementally, the gate 12 incrementally forces the pipe 33 away from base 11. When a section of the pipe 33 proximate with the gate 25 is softened sufficiently by the heat of a fire, the gate 25 of the damper 10 pressures the sidewalls of this pipe section together, pinching off the flow of hot gases through the pipe 33, so that heat softening of the plastic pipework downstream of the gate 25 is halted (FIG. 3). In situations in which the pipe 33 disintegrates very quickly or ignites instantaneously, the gate 25 will close off the opening 32 even faster.

Once a damper 10 is installed proximate with a pipe 33 in an opening 32 to an existing passageway 31, the damper is preferably left in place in the event the pipe 33 is subsequently removed during plumbing renovations. In this case, the damper 10 functions to cap the opening 32, closing the passageway 31 prior to a fire. Also, since the damper 10 is readily retrofitted to existing building structures without significant altercation thereof, the damper 10 can be installed, for the first time, after the pipe 33 has been removed and no longer occupies the passageway 31.

In addition, the damper 10 is preferably mounted at each end of a passageway 31 for a pipe 33 through a wall or floor so that whichever side of the structure is exposed initially to flames or heat, the passageway 31 and opening 32 can be effectively closed off as soon as possible. When the pipe 33 deforms or disintegrates from heat, a portion of the pipe 33 may remain within passageway 31, after the gate 25 has completely covered the opening 32. To provide for a spring with sufficient force to counteract, if need be, the force of gravity which may act upon the remaining portion of pipe and tend to force the gate 25 open, especially when a damper is situated beneath a floor structure, a damper modified to include more than one torsion spring is preferably utilized.

Figure 5:
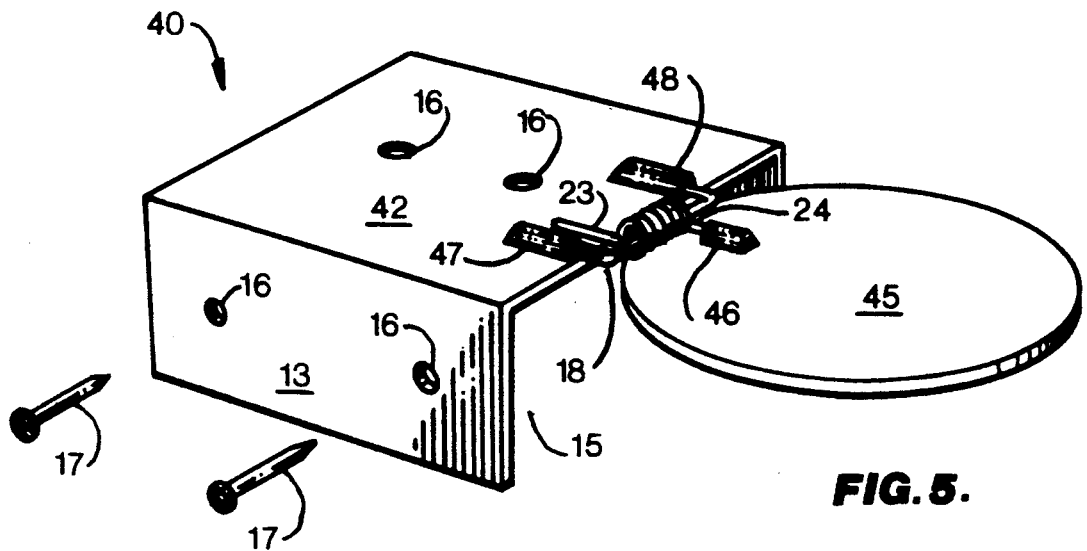
FIG. 5 is a perspective view of a second embodiment of the present invention.
Figure 6:
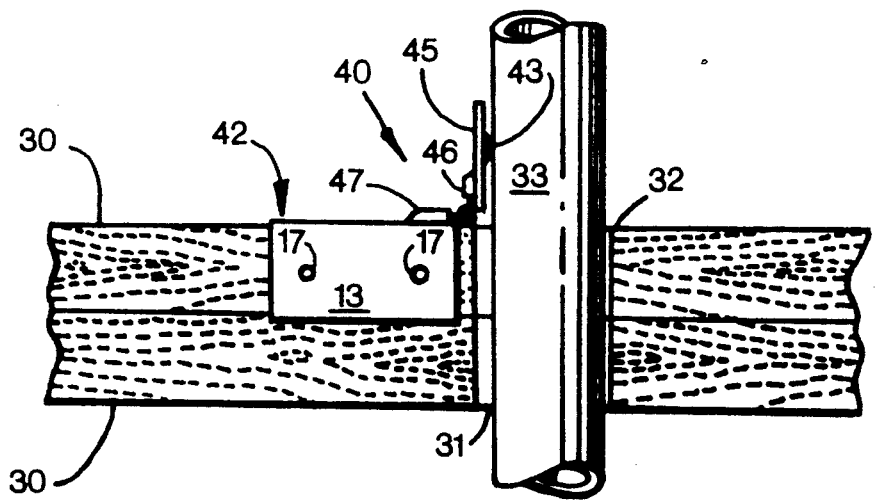
FIG. 6 is a side view of the fire damper shown in FIG. 5 installed astraddle a double top plate of a wall, a gate of the damper being shown in operative position adapted to press the proximate sidewalls of a plastic pipe together in the event they are softened.

In an alternate embodiment of the present invention illustrated in FIG. 5, a fire damper 40 includes a modified support member 42 and a gate 45. An arm 24 of the spring 20 is secured to the gate 45 within a raised section 46. The raised section 46 is preferably stamped into the gate 45 during its fabrication from sheet metal or the like. When the arm 24 is properly positioned within the raised section 46, the walls of the section 46 are swaged against the arm 24 locking it in place. Similarly, the end branches of the spring support 18 in the damper 40 are locked within raised sections 47 and 48, respectively, of the support member 42. The raised sections 47, 48 are integral parts of the support member 42 preferably stamped into sheet metal or like material forming the support member. As illustrated in FIG. 6, the damper 40 further comprises a bumper 43 formed of a rubber-like or resilient material affixed to the side of the gate 45 in a position to contact the intact pipe 33. The bumper 43 is employed to reduce any vibrations of the pipe 33.

Figure 7:
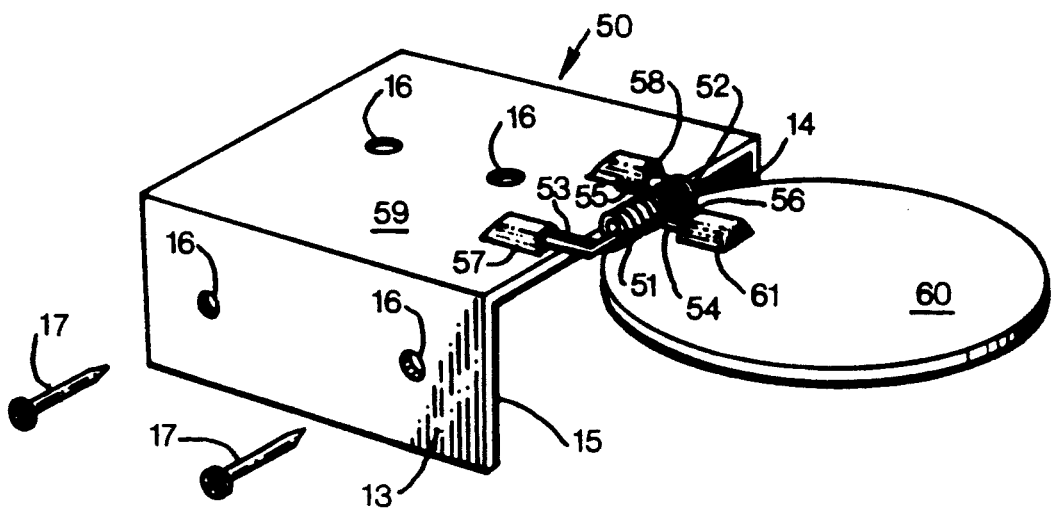
FIG. 7 is a perspective view of a third embodiment of the present invention.

In a further alternate embodiment of the present invention illustrated in FIG. 7, a fire damper 50 includes two torsion springs 51, 52, which communicate with a single U-shaped support. The end branches of the U-shaped support are held fixedly within raised sections 57, 58, respectively, formed on a modified support member 59. A free arm 53, 55 of each of the springs 51 and 52, respectively, is forced against the support member 59 by the spring forces. The other arms 54 and 56 of the torsion springs 51 and 52, respectively, are held fixedly within a raised section 61 formed by stamping or the like as an integral part of a modified gate 60.

Figure 8:
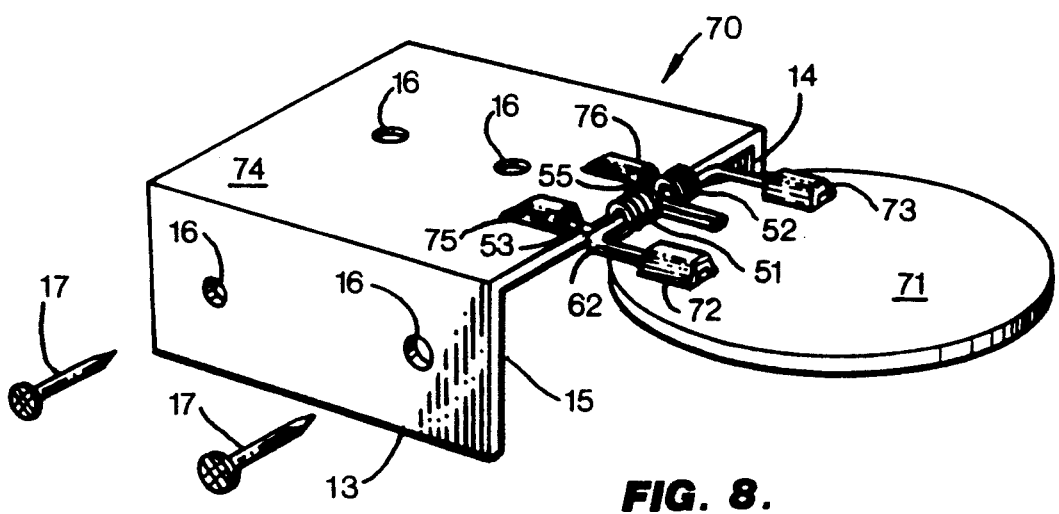
FIG. 8 is a perspective view of a fourth embodiment of the present invention.

In a still further alternate embodiment of the present invention illustrated in FIG. 8, a fire damper 70, like the damper 50, comprises two torsion springs 51, 52 which communicate with a single U-shaped support 62; but in the damper 70, the end branches of the U-shaped support are held fixedly within raised sections 72 and 73 on the gate 71. One arm 53, 55 of each of the torsion springs 51 and 52, respectively, is fixedly attached to the plate 74 with the raised sections 75 and 76, respectively. The other arms 54 and 56 of the torsion springs 51 and 52, respectively, are free and press against the gate 71.

To facilitate mounting the damper 10, 40, 50, 70 on a structural element having surface which cannot accommodate a flange, the base of each of these dampers is preferably modified. In such a case, a flat planar element, similar to the support member 12, 42, 59, 74, respectively, but without the flanges 13, 14 attached thereto, is preferably utilized.

It will be further obvious to those skilled in the art that many variations may be made in the above embodiments here chosen for the purpose of illustrating the present invention, and full resort may be had to the doctrine of equivalents without departing from the scope of the present invention, as defined by the appended claims.

What is claimed is:

1. A fire damper for closing off an opening to a passageway in a building structure, comprising:
    (a) mounting means adapted to be secured to a portion of the building structure, said portion being situated on only one side of the opening;
    (b) a single gate with at least one face;
    (c) at least one torsion spring having a coil and first and second arms extending thereform, the first arm being fixedly attached to said face of the gate; and
    (d) a spring support which is fixedly attached to the mounting means, a section of the spring support being spaced apart from the mounting means; the coil having a through passageway for receiving said spaced apart section of the spring support; only the spring and the spring support pivotally connecting the gate and the mounting means; the second arm of the torsion spring being disposed between the gate and the mounting means, the second arm abutting the mounting means, the first and second arms of the spring urging the gate away from the mounting means.

2. The fire damper according to claim 1, wherein said mounting means further includes a generally flat support member.

3. The fire damper according to claim 2, wherein said mounting means further includes at least one flange extending generally perpendicularly to the support member.

4. The fire damper according to claim 1, wherein said mounting means further comprises a channel-shaped member, the channel-shaped member being adapted for straddling a wall plate in a building structure.

5. A fire damper for closing off an opening to a passageway in a building structure, comprising:

(a) mounting means having at least one face, the mounting means being adapted to be secured to a portion of the building structure which is situated on only one side of the opening;

(b) a single gate;

(c) at least one torsion spring having a coil and first and second arms extending thereform, the first arm being fixedly attached to said face of the mounting means; and (d) a spring support which is fixedly attached to the gate, a section of the spring support being spaced apart from the gate; the coil having a through passageway for receiving said spaced apart section of the spring support; only the spring support and the spring pivotally connecting the gate and the mounting means; the second arm of the torsion spring being disposed between the gate and the mounting means, the second arm abutting the gate, the first and second arms of the spring urging the gate away from the mounting means.

6. A fire damper for covering an opening to a passageway defined by a building structure, the passageway being adapted to receive a plastic pipe therethrough, comprising:

(a) a base which can be mounted on the building structure in a position external to the passageway and adjacent to only one side of the opening, so that the base can be mounted onto the building structure after the pipe has already been installed through the opening without disturbing the pipe;

(b) a gate sized to cover the opening and pivotally attached to said base;

(c) at least one torsion spring having a coil; and (d) means for pivotally connecting the gate and the base, the means for pivotally connecting having at least one pivotal joint, each pivotal joint having only two components, the coil of the spring forming one of said components, the spring forcing the gate against the pipe and closing the opening when the pipe has melted or been removed, so that the fire is impeded from spreading along the pipe beyond the damper.

7. A fire damper according to claim 6 which further comprises a vibration damping means attached to the gate at a position thereon where the gate contacts the pipe when its shape has not been distorted by fire.

8. A fire damper for covering an opening to a passageway defined by a building structure, the passageway being adapted to receive a plastic pipe therethrough, comprising:

(a) a base which can be mounted on the building structure in a position external to the passageway and adjacent to only one side of the opening, so that the base can be mounted onto the building structure after the pipe has already been installed through the opening without disturbing the pipe;

(b) a gate sized to cover the opening and pivotally attached to said base;

(c) at least one torsion spring which forces the gate against the pipe and closes the opening when the pipe has melted or been removed, so that the fire is impeded from spreading along the pipe beyond the damper; and (d) a vibration damping means including a resilient material affixed to the gate at a location thereon where the gate contacts the pipe when its shape has not been deformed by heat or fire.

* * * * *